(12) United States Patent
Föster et al.

(10) Patent No.: US 8,307,965 B2
(45) Date of Patent: Nov. 13, 2012

(54) VIBRATION DAMPER WITH ADJUSTABLE DAMPING FORCE

(75) Inventors: Andreas Föster, Schweinfurt (DE); Alfred Wirth, Schweinfurt (DE); Heinz-Joachim Gilsdorf, Donnersdorf (DE); Thomas Kutsche, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1344 days.

(21) Appl. No.: 11/546,786

(22) Filed: Oct. 12, 2006

(65) Prior Publication Data

US 2007/0084687 A1    Apr. 19, 2007

(30) Foreign Application Priority Data

Oct. 13, 2005   (DE) .......................... 10 2005 048 949

(51) Int. Cl.
*F16F 9/10*   (2006.01)
(52) U.S. Cl. .................. 188/318; 188/281; 188/322.14; 188/322.13
(58) Field of Classification Search .................. 188/280, 188/281, 282.1, 282.5–282.9, 285, 322.13, 188/318
See application file for complete search history.

(56) References Cited

U.S. PATENT DOCUMENTS

| 5,462,140 | A | * | 10/1995 | Cazort et al. ................... | 188/275 |
| 5,586,627 | A | * | 12/1996 | Nezu et al. ................... | 188/266.6 |
| 5,667,041 | A | * | 9/1997 | Jensen ........................... | 188/284 |
| 5,788,030 | A | * | 8/1998 | Rottenberger ................. | 188/290 |
| 5,937,975 | A | * | 8/1999 | Forster ......................... | 188/266.6 |
| 5,996,748 | A |   | 12/1999 | Nezu et al. | |
| 6,035,979 | A | * | 3/2000 | Forster ......................... | 188/266.6 |
| 6,112,866 | A | * | 9/2000 | Boichot et al. .............. | 188/299.1 |
| 6,394,238 | B1 | * | 5/2002 | Rogala ......................... | 188/266.2 |
| 6,464,048 | B1 | * | 10/2002 | Groves et al. .............. | 188/266.6 |
| 7,347,307 | B2 | * | 3/2008 | Joly ............................. | 188/266.5 |
| 7,438,164 | B2 | * | 10/2008 | Groves et al. ................. | 188/315 |
| 7,699,147 | B2 | * | 4/2010 | Preukschat et al. ......... | 188/282.4 |
| 2002/0074197 | A1 |   | 6/2002 | Preukschat et al. | |
| 2005/0115786 | A1 | * | 6/2005 | Forster ..................... | 188/322.15 |
| 2005/0121268 | A1 | * | 6/2005 | Groves et al. .............. | 188/266.6 |
| 2007/0084687 | A1 | * | 4/2007 | Foster et al. ............... | 188/322.2 |

FOREIGN PATENT DOCUMENTS

| DE | 27 45 768 | 4/1978 |
| DE | 197 11 293 | 11/1997 |
| DE | 197 22 216 | 1/1998 |
| DE | 2004 054 474 | 6/2006 |
| EP | 0 677 679 | 10/1995 |
| EP | 1 215 413 | 6/2002 |
| GB | 1 593 258 | 7/1981 |
| WO | WO 00/52354 | 9/2000 |

* cited by examiner

*Primary Examiner* — Bradley King
*Assistant Examiner* — Thomas Irvin
(74) *Attorney, Agent, or Firm* — Cozen O'Connor

(57) ABSTRACT

The vibration damper with an adjustable damping force includes a cylinder filled with a damping medium, a piston rod axially movable in the cylinder and carrying a piston which divides the cylinder into a first working space on the piston rod side and a second working space on the side away from the piston rod, a first adjustable damping valve which is connected to at least one of the two working spaces by means of a fluid connection, at least one second valve which is connected hydraulically in parallel to the first adjustable damping valve, and a third damping valve arranged in series to and upstream from both the first and second valves, the third damping valve moving in a closing direction as a function of a flow velocity of the damping medium through the third damping valve.

9 Claims, 4 Drawing Sheets

VIBRATION DAMPER WITH ADJUSTABLE DAMPING FORCE

BACKGROUND OF THE INVENTION

The invention relates to a vibration damper with adjustable damping force.

DE 10 2004 054 474 B3 describes a vibration damper with adjustable damping force, comprising a piston rod, which is installed together with a piston with freedom of axial movement in a cylinder filled with damping medium, wherein the piston divides the cylinder into a working space on the side of the piston rod and a working space on the side away from the piston rod. The vibration damper further comprises an adjustable damping valve, which is connected to at least one of the two working spaces by a fluid connection. Another damping valve which moves in the closing direction as a function of the flow velocity of the damping medium is connected in series, relative to the flow of the damping medium, to the adjustable damping valve. A pressure-limiting valve in the form of a bottom valve is connected hydraulically in parallel to the adjustable damping valve. In this design, it has been observed that the action of the damping valve which acts as a function of the flow velocity of the damping medium is also dependent on the adjustable damping valve installed downstream. When the piston rod travels inward and the flow through the adjustable damping valve is at its maximum, the velocity-dependent damping valve can assume a throttling position relative to the parallel bottom valve even at a relatively slow inward travel velocity. After the closing, the volume flow rate through the bottom valve would then be correspondingly greater. If, however, the adjustable damping valve assumes an operating position with a strong damping force and throttling action, the velocity-dependent damping valve can be in a state in which it exerts almost no effect at all. This effect becomes more obvious when the adjustable damping valve is imagined as a valve which can be completely blocked. In this case, there would be no volume flow rate at all through the velocity-dependent damping valve either. This dependence between the adjustable damping valve, the pressure-limiting valve or bottom valve, and the velocity-dependent damping valve determines the point at which the velocity-dependent damping valve goes into action. It is therefore very difficult to determine the closing behavior of the velocity-dependent damping valve.

SUMMARY OF THE INVENTION

It is an object of the present invention to correct the previously described problem of the division of the volume flow rates originating from the working space on the side of the piston rod.

According to a preferred embodiment of the invention, the vibration damper with an adjustable damping force includes a cylinder filled with a damping medium, a piston rod axially movable in the cylinder and carrying a piston which divides the cylinder into a first working space on the piston rod side and a second working space on the side away from the piston rod, a first adjustable damping valve connected to at least one of the two working spaces by a fluid connection, at least one second valve connected hydraulically in parallel to the first adjustable damping valve, and a third damping valve arranged in series with and upstream of the first and second valves relative to a flow of damping medium from that at least one of the two working spaces to the first and second valves, the third damping valve moving in a closing direction as a function of a flow velocity of the damping medium through the third damping valve.

A great advantage is that, as a result of the upstream position of the velocity-dependent third damping valve, the damping force characteristic of the vibration damper can be determined independently of the first adjustable damping valve. The volume which is displaced by the velocity-dependent third damping valve corresponds to the volume of the inward-traveling piston rod. The damping force which is present then depends only on the velocity of the piston rod and on the damping force characteristic of the velocity-dependent third damping valve. How the displaced volume is divided after it leaves the velocity-dependent third damping valve is irrelevant. As a result, the second damping valve, that is, for example, a bottom valve, and the first adjustable damping valve can be designed more effectively to provide the desired damping force characteristic.

In an advantageous embodiment, a distributor element is arranged downstream from the second working space. The first adjustable damping valve and the at least one second damping valve are connected to this distributor element, wherein a separating disk is present between the distributor element and the second working space. The separating disk can serve as a valve seating surface for the velocity-dependent third damping valve.

The distributor element can be designed as an extension of the cylinder. In principle, the distributor element could also be installed in a section of a hose outside the vibration damper. Making it part of the cylinder, however, minimizes the consequences of any leakage which may occur. This multi-part solution simplifies the production of the cylinder, in that a simple tube can be used for the working spaces on the two sides of the piston, whereas the extension, which contains the separating disk as an integral part can be made advantageously as a casting or forging.

The distributor element is centered radially on the cylinder, so that, in the case of a vibration damper of the two-tube type, the diameter does not depend on the size of a container tube.

So that the vibration damper will never be blocked, a fourth pressure-limiting valve is connected in parallel to the third velocity-dependent valve.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below on the basis of the following description with reference to the drawings.

DETAILED DESCRIPTION OF THE PRESENTLY PREFERRED EMBODIMENTS

Figure 1:
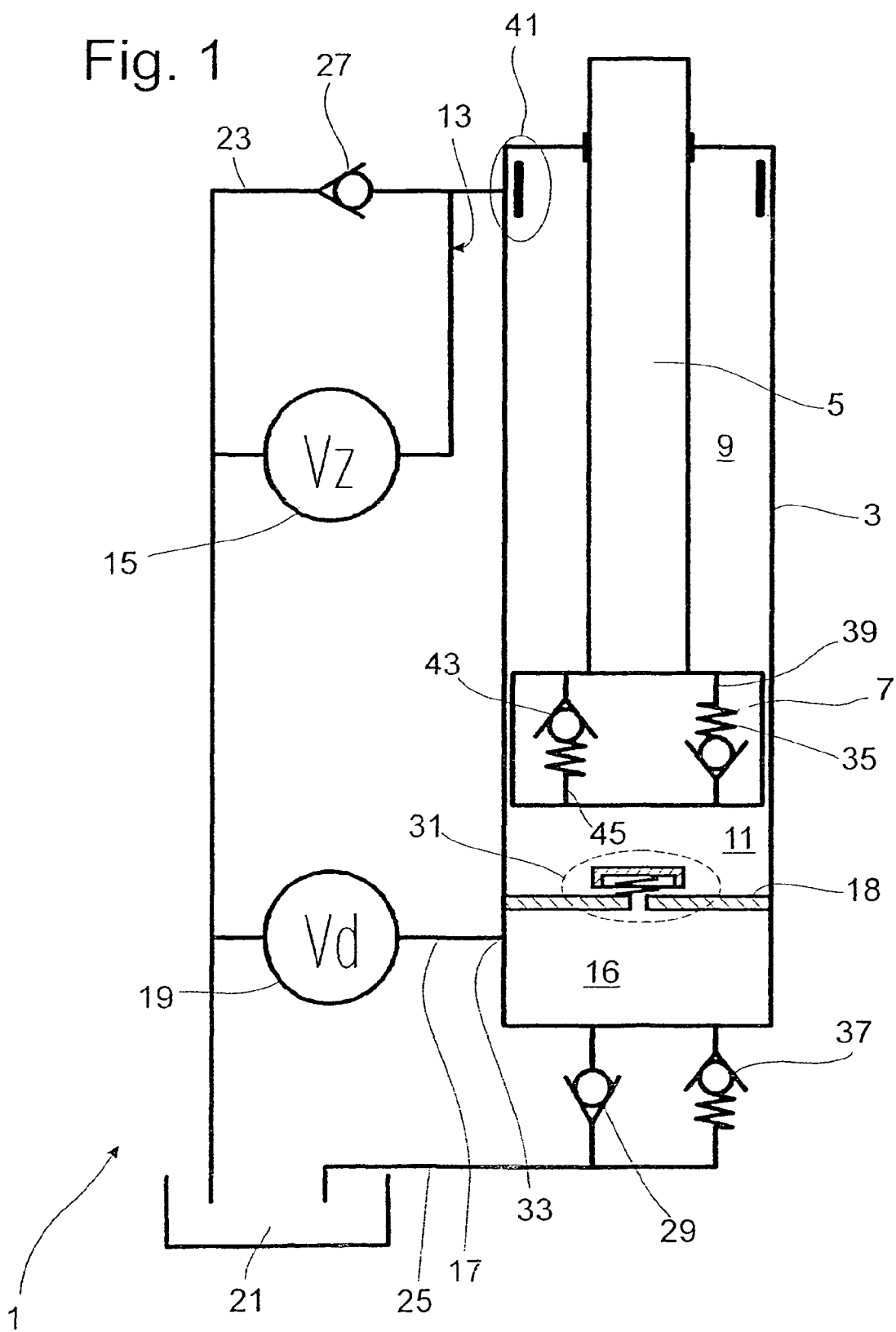
FIG. 1 is a schematic equivalent circuit diagram of a vibration damper according to the invention.

FIG. 1 is a schematic block diagram of a vibration damper 1, which comprises a cylinder 3 filled with a damping medium, in which cylinder a piston rod 5 carrying a piston 7 is guided with freedom of axial movement. The piston 7 divides the cylinder 3 into a working space 9 on the side of the piston rod 5 and a working space 11 on the side away from the piston rod 5. In principle, the piston 7 can be a simple displacement element without through-channels. The working space 9 on the piston rod side is connected by a fluid connection 13 to an adjustable damping valve 15. Adjacent to the working space 11 on the side away from the piston rod is a distribution space 16, which has a fluid connection 17 leading to a separately adjustable damping valve 19. Between the distribution space 16 and the working space 11 on the side away from the piston rod there is a separating disk 18. The damping medium displaced into the adjustable damping valves 15, 19 from the working spaces 9, 11 flows into a compensating space 21. Both the working space 9 on the side of the piston rod and the working space 11 on the side away from the piston rod are connected to the compensating space 21 by return flow lines 23, 25 in combination with check valves 27, 29, which open in the flow direction toward the working spaces 9, 11.

A damping valve 31, which moves in the closing direction as a function of the flow velocity of the damping medium, is installed in series upstream from the adjustable damping valve 19, which goes into action during the inward travel of the piston rod 5. A pressure-limiting valve 37 is connected in parallel to the adjustable damping valve 19; this pressure-limiting valve 37 also being connected in series downstream from the velocity-dependent damping valve 31. A pressure-limiting valve 35 can also be installed in a flow connection 39 between the two working spaces 9, 11, e.g. in the piston 7.

The working space 9 on the piston rod side can also be equipped with a damping force-increasing damping valve 41, which is connected in series to the adjustable damping valve 15. In this case, a pressure-limiting valve 43, for example, is advisably installed in a flow connection 45 in the piston 7.

During normal operation of the vibration damper, the piston rod 5 and thus the piston 7 travel into the cylinder 3 and compress the working space 11 on the side away from the piston rod. The velocity-dependent damping valve 31 in the separating disk 18 is open, but the check valve 29 is closed. Depending on the desired damping force, some or all of the pressurized damping medium present in the working space 11 can escape through the inlet 33 of the fluid connection 17 and arrive at the adjustable damping valve 19 and/or through the opened pressure-limiting valve 37, which can be formed by a bottom valve known per se, and thus ultimately arrive at the compensating space 21. The distribution of the flow volume between the adjustable damping valve 19 and the pressure-limiting valve 37 is determined by the relationship between the current damping force setting of the damping valve 19 and the pressure-limiting valve 37. Depending on the design of the piston 7, e.g., as a simple displacement element or as a conventional damping valve, damping medium can flow via the opened check valve 27 or through the piston 7 into the annular working space 9 on the side of the piston rod, so that no negative pressure can develop there.

When the piston rod 5 travels inward at extremely high velocity, the damping valve 31, which closes as a function of velocity, assumes the closed position, which does not necessarily mean that there is complete blockage between the working space 11 on the side away from the piston rod and the distribution space 16. As also during normal operation, the volume displaced into the distribution space 16 is divided in the direction toward the compensating space 21 between the adjustable damping valve 19 and the pressure-limiting valve 37. The action point at which the velocity-dependent damping valve 31 goes into action therefore depends exclusively on the velocity of the piston rod 5, not at all on the setting of the adjustable damping valve 19, which means that it is easy to determine this action point.

Figure 2:
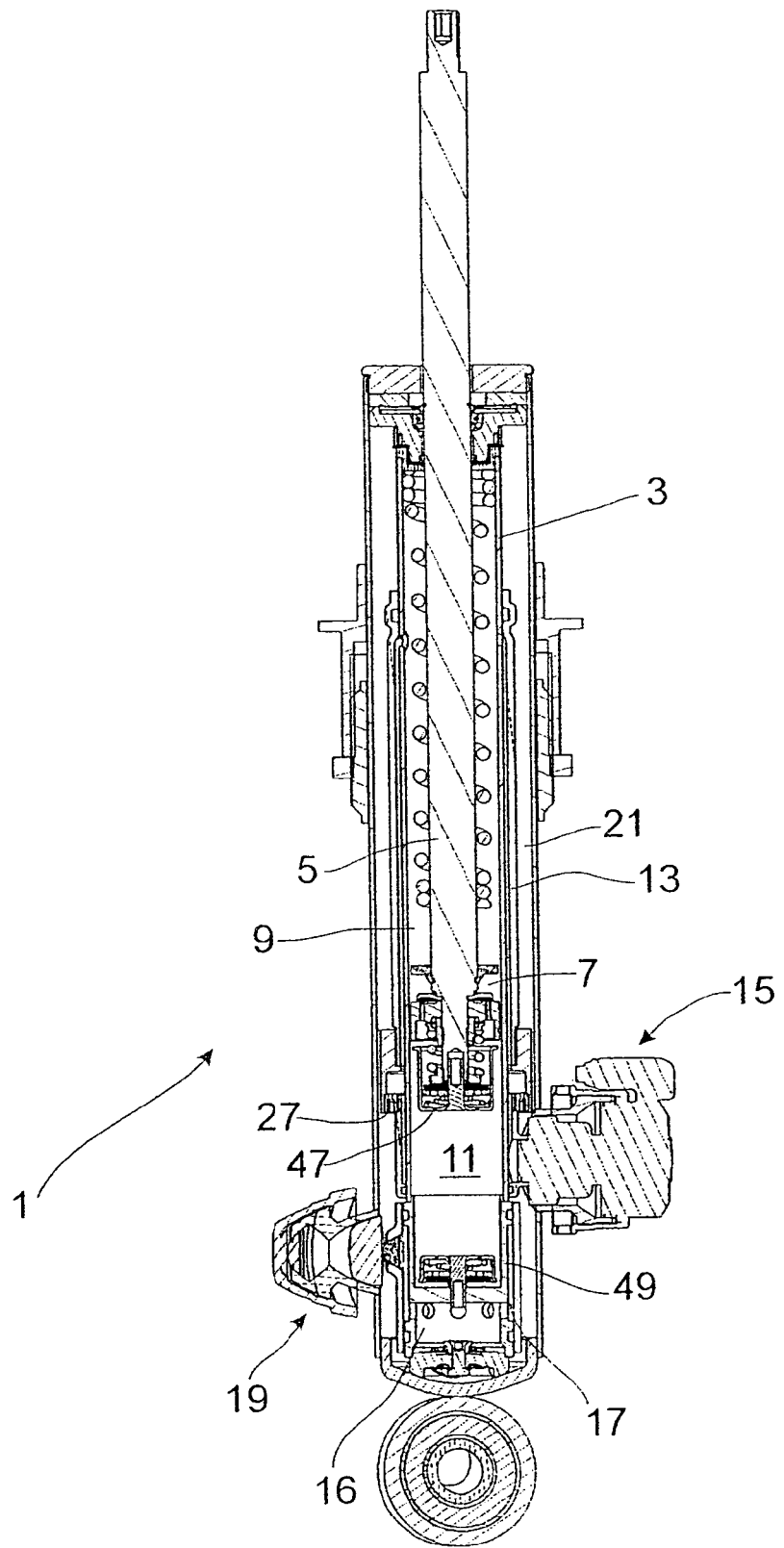
FIGS. 2 and 3 are cross sectional views through a vibration damper according to the invention.
Figure 3:
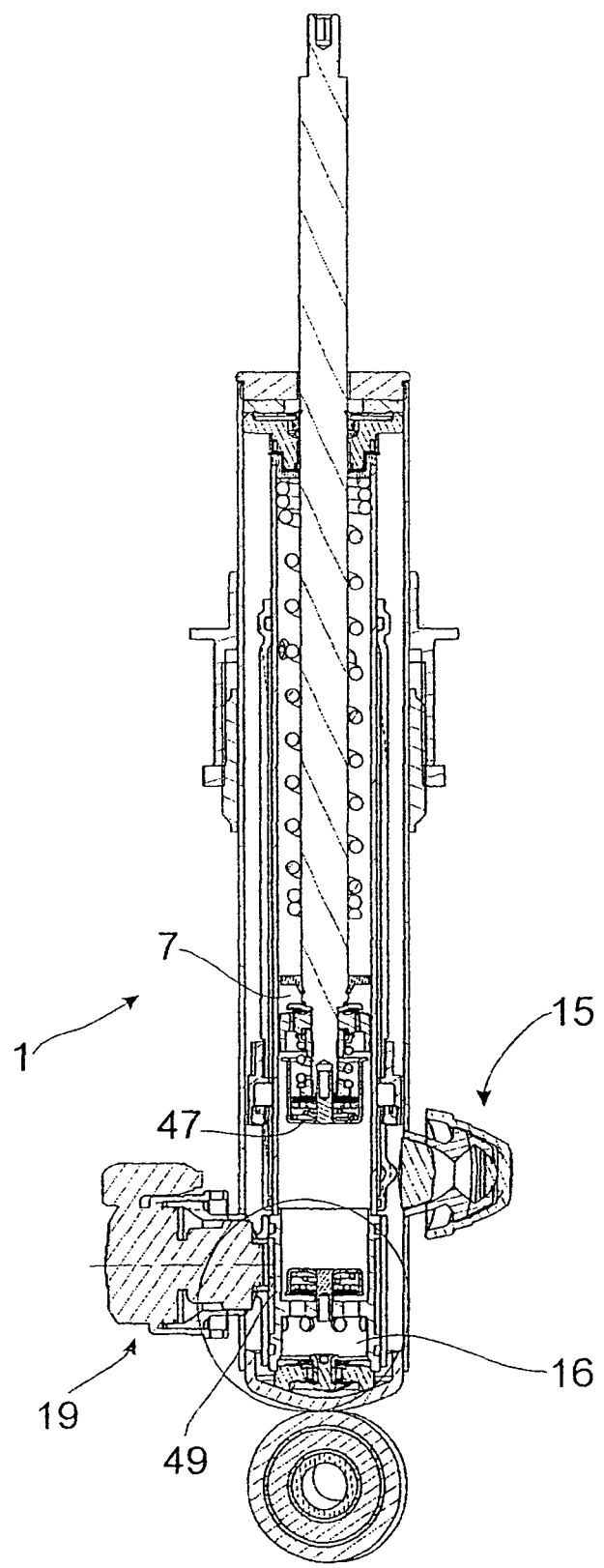

FIGS. 2 and 3 are cross sectional construction drawings of a vibration damper 1 corresponding to the schematic circuit diagram of FIG. 1. The area of the adjustable damping valves 15, 19 is shown in a simplified manner, because the design is already known from DE 197 22 216 C1. The piston 7 is designed as a conventional damping piston and also has a damping valve 47, which closes as a function of velocity, as illustrated in FIG. 5 of DE 10 2004 054 474 B3, the disclosure content of which is to be considered part of the description of the present figures. In addition, it can also be seen from FIGS. 2 and 3 that the distribution space 16 is formed by a distributor element 49, which means that the cylinder 3 is designed to consist of at least two parts in the axial direction. The distributor element 49 is centered by its outside wall on the inside diameter of the cylinder 3.

Figure 4:
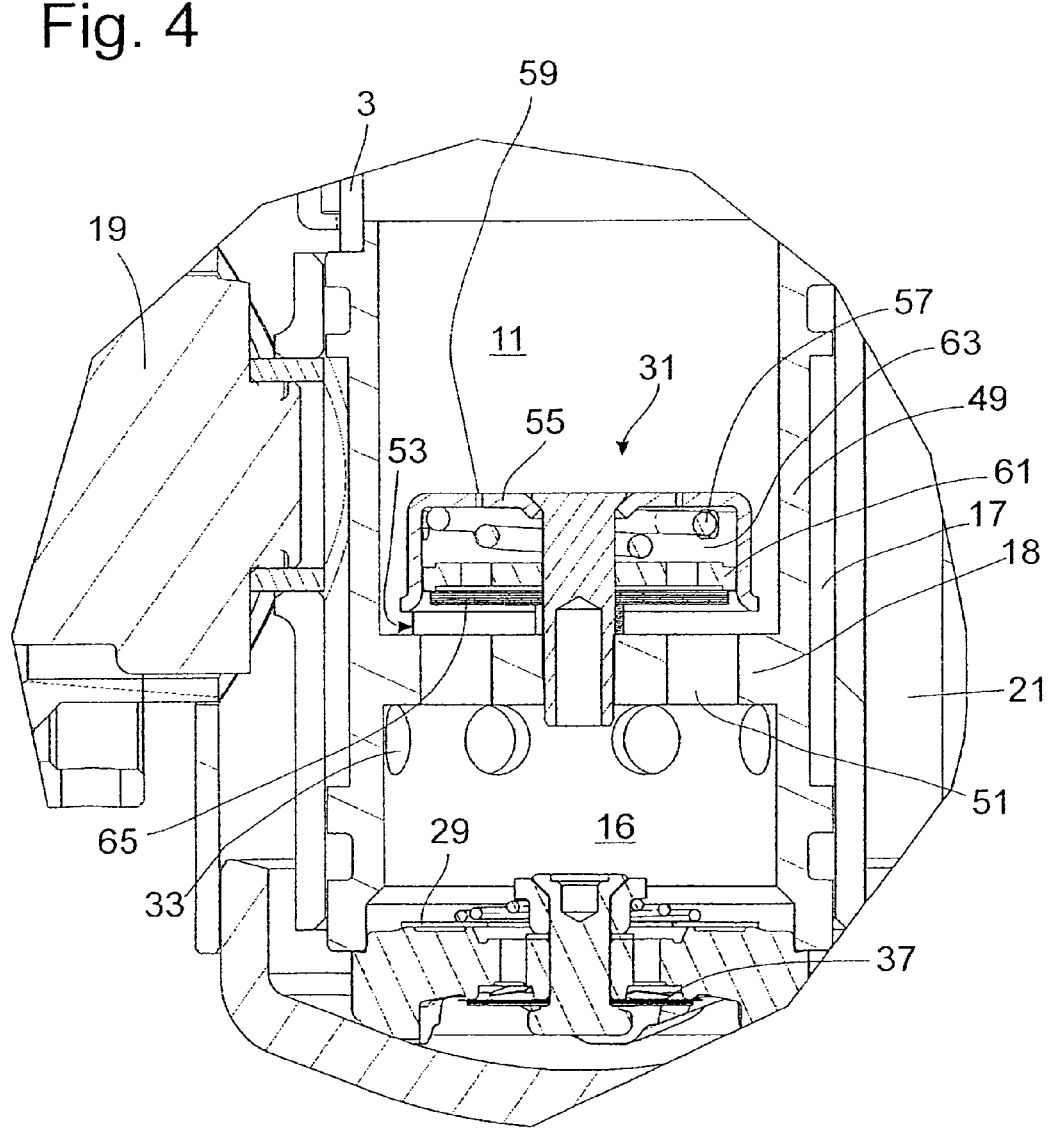
FIG. 4 is a detailed cross sectional view of a part of the vibration damper shown in FIGS. 1 and 2.

FIG. 4 shows that the distributor element 49 is designed as a tubular body with an integral separating disk 18. The separating disk 18 contains a number of through-openings 51. The cross section of the inlet 53 of the through-openings 51 can be decreased by a cup-shaped valve body 55 installed in the working space 11 on the side away from the piston rod. A spring 57 pretensions the valve body 55 in the opening direction. At least one throttle opening 59 is provided in a bottom part of the valve body 55; which opening 59 allows the damping medium to flow to a throttle disk 61, the channels 63 of which are covered by at least one valve disk 65, so that the throttle openings 59, in conjunction with the throttle disk 61 and the at least one valve disk 65, form a pressure-limiting valve, which is connected in parallel to the velocity-dependent damping valve 31.

When the piston rod 5 travels at high velocity in the inward direction and the damping medium thus flows at high velocity as well, the pressure in the inlet area 53 between the separating disk 18 and the edge of the cup-shaped valve body 55 decreases, with the result that the pressure present in the working space 11 on the side away from the piston rod moves the valve body 55 toward the separating disk 18. If the pressure exceeds a predetermined level, the damping medium can flow through the throttle openings 59 and the throttle disk 61 and thus lift the valve disk 65 from the throttle disk 61. The displaced damping medium arrives in the distribution space 16 and can then flow into the compensating space 21 as a function of the adjustable damping valve 19 and the additional damping valve 37, which is designed as a bottom valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper with an adjustable damping force, comprising:
   a cylinder filled with a damping medium;
   a piston rod axially movable in the cylinder and carrying a piston which divides the cylinder into a first working space on the piston rod side and a second working space on the side away from the piston rod;
   a first adjustable damping valve connected to at least one of the two working spaces by a fluid connection;
   at least one second valve connected hydraulically in parallel to the first adjustable damping valve;
   a third damping valve arranged in series with and upstream of the first and second valves relative to a flow of damping medium from the at least one of the two working spaces to the first and second valves, the third damping valve being a velocity-dependent damping valve that is open during normal operation as the damping medium flows from the at least one of the two working spaces to the first and second valves, and moving in a closing direction as a function of a flow velocity of the damping medium through the third damping valve toward the first and second valves;
   a forth pressure-limiting valve connected in parallel to the third damping valve between the at least one of the two working spaces and the first and second valves;
   a distributor element arranged downstream from the second working space and connected to the first adjustable damping valve and the at least one second valve; and
   a separating disk arranged between the distributor element and the second working space, the separating disk forming part of the third damping valve.

2. The vibration damper of claim 1, wherein the distributor element is an extension of the cylinder.

3. The vibration damper of claim 2, wherein the distributor element is centered radially on the cylinder.

4. The vibration damper of claim 1, wherein the separating disk is an integral part of the distributor element.

5. The vibration damper of claim 1, wherein the third damping valve includes a cup-shaped valve body.

6. The vibration damper of claim 5, wherein the separating disk separates the at least one of the two working spaces and a distributing space in the cylinder.

7. The vibration damper of claim 6, wherein the separating disk includes through-openings and the cup-shaped valve body defines inlets of the through-openings.

8. The vibration damper of claim 7, wherein the separating disk is a valve seat for the third damping valve.

9. The vibration damper of claim 7, wherein the separating disk is arranged in the cylinder and separates the second working space from the distribution space, the distribution space being linearly aligned with the second working space.

* * * * *